Dec. 21, 1948.                    E. B. WOLFFE                    2,456,806
                                  VAGINAL GAUGE
Filed Jan. 14, 1947                                           2 Sheets-Sheet 1
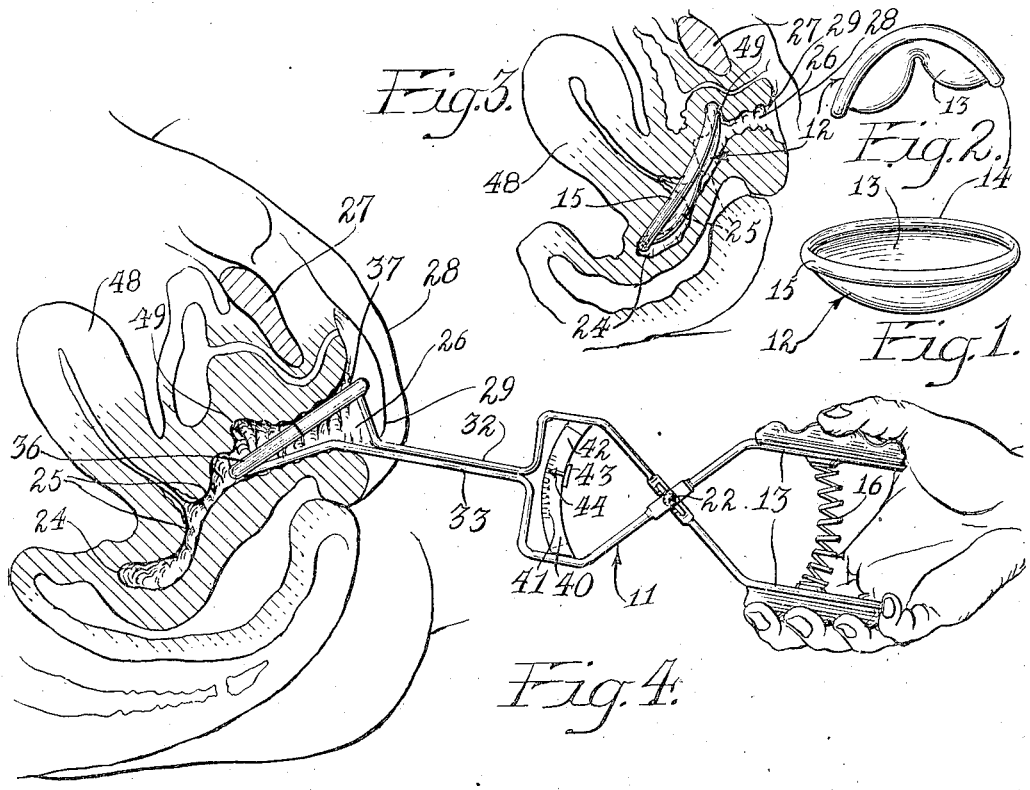
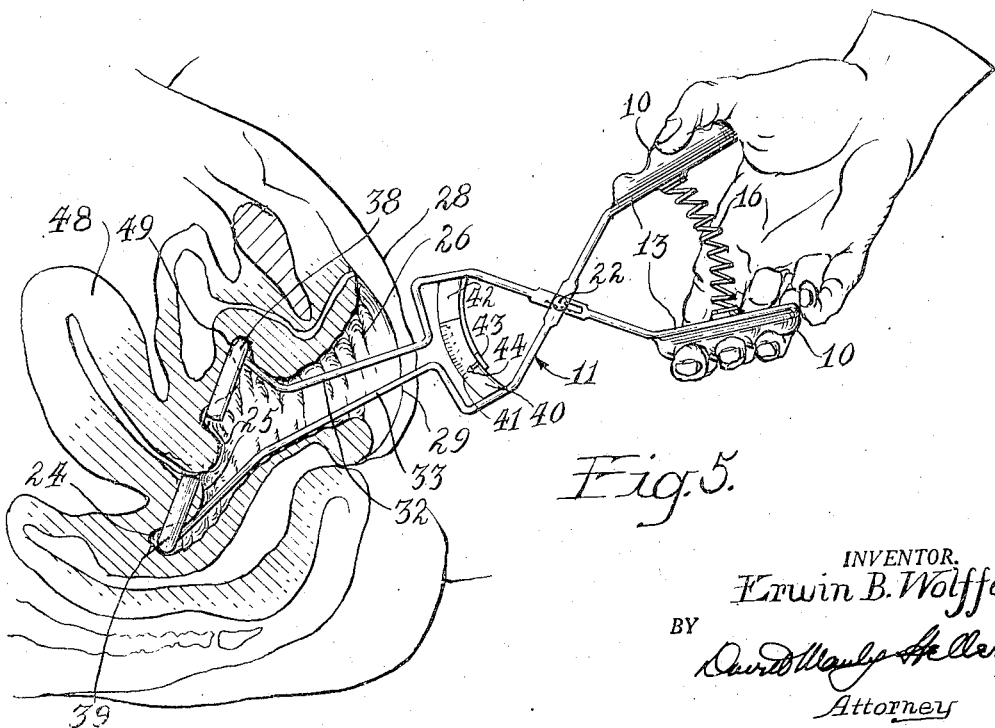
INVENTOR.
Erwin B. Wolffe
BY
David Maule Heller
Attorney

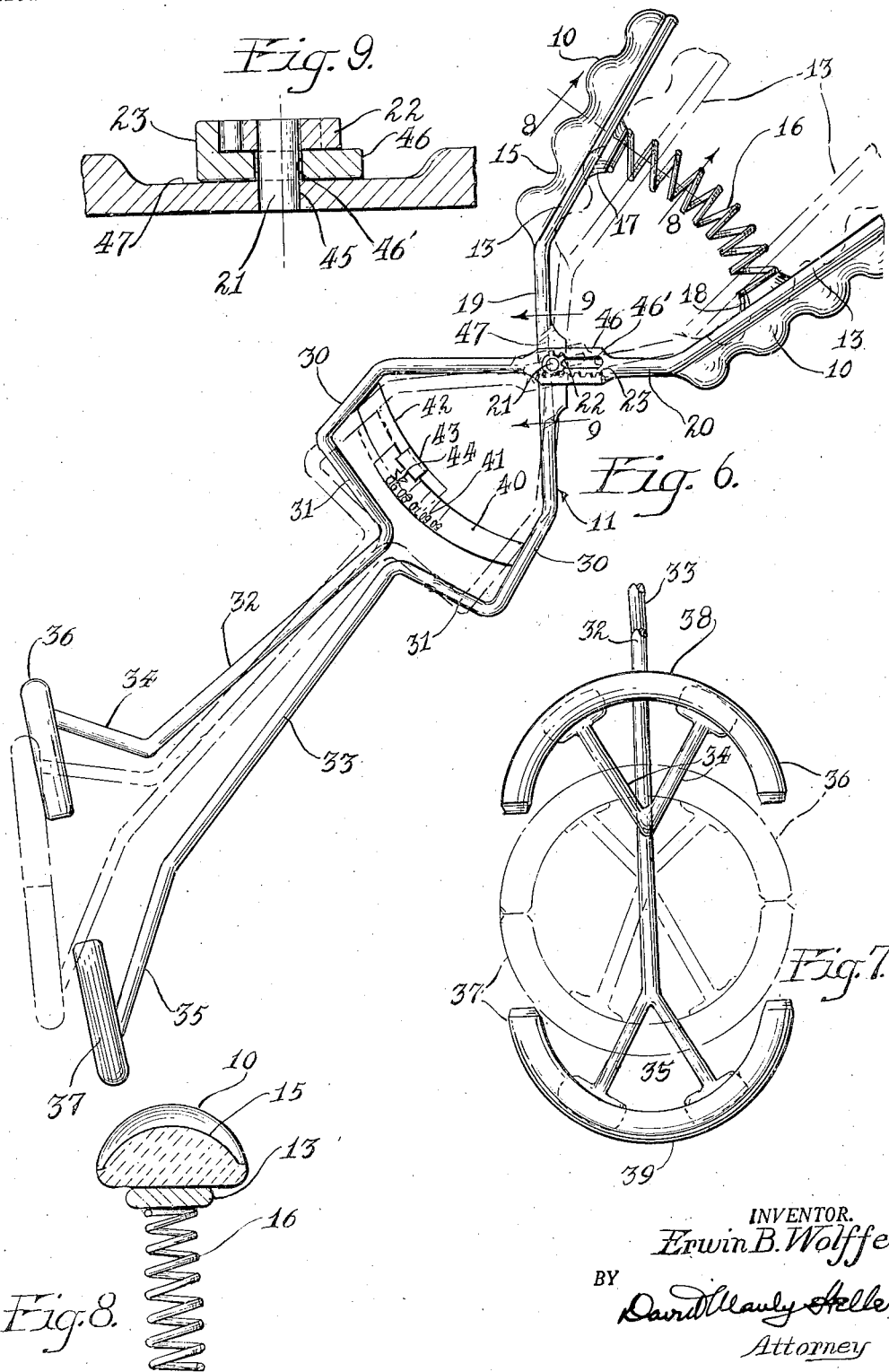

Patented Dec. 21, 1948

2,456,806

UNITED STATES PATENT OFFICE 2,456,806

VAGINAL GAUGE

Erwin B. Wolffe, Chicago, Ill.

Application January 14, 1947, Serial No. 722,001

4 Claims. (Cl. 33—174)

My invention relates to vaginal gauges for the measurement of vaginal areas adapted to receive in sealing, and in proper seating relationship pessaries, or similar contraceptives used in the medical profession.

An important object of my invention is to provide a gauge of the aforementioned character which is constructed of two cross levers fulcrumed, at an intermediate point, and normally urged by spring means in open relationship, the said levers being provided with an arcuately shaped measuring gauge, and being further provided with semi-circularly shaped arms, or termini for seating in the posterior fornix area, and the recess directly under the pubic bone area, where the pessary is customarily seated to form a seal and obstruction to the union or fusion of the ova and the spermatozoa, in other words, to prevent conception.

Another object of my invention is to provide a vaginal gauge of the aforementioned character having two terminal legs, one terminal being shorter than the other, so that the semi-circular gauging portions attached to the said legs will always be maintained in the same geometric plane regardless of whether the gauge is in closed position, or in any of the varied openings to which it may be positioned, in actual use and operation.

A further object of my invention is to provide a vaginal gauge of the aforementioned character which is normally maintained in its maximum open position, and is closed before insertion into the vaginal cavity wherein measurements are to be taken.

A further object of my invention is to provide in a gauge of the aforementioned character rack and pinion means at the fulcrum thereof, to provide equalizing effects for the terminal gauging portions thereof, maintaining them in the same geometric plane regardless of the positions thereof, whether in open or closed position.

A further object of my invention is to provide a gauging device of the aforementioned character which is simple in construction, practical and efficient in its operation and use, and of such simple elemental construction as to lend itself readily to economical manufacture in quantity production.

Other features, inherent advantages, and ancillary objects resident in my invention will become apparent from an examination of the accompanying drawings, having further elucidation in the ensuing description, wherein like symbols are used to designate like parts, and, in which:

Fig. 1 represents a perspective view of a pessary used for contraceptive purposes.

Fig. 2 shows the bending or flexure of the said pessary illustrated in Fig. 1, preparatory to its insertion in the vaginal area.

Fig. 3 is a sectional view showing the vaginal structure, and the pessary positioned in place for effective prevention.

Fig. 4 is a view showing my instrumentality preparatory to its being positioned in the vaginal area.

Fig. 5 is a view similar to Fig. 4 showing my gauge inserted, and in distended position, gauging the internal area between the posterior fornix, and the recessed portion directly below the pubic bone area, indicating thereon the proper gauging and showing the dimensions, or diameter of pessary that is best fitted or required in that particular case.

Fig. 6 is an enlarged view of my vaginal gauge, or instrument showing in dotted lines the closure thereof, and in full lines, the maximum opening thereof, also indicating gauging facilities from 50 millimeters to 90 millimeters, to take in the entire range of diameters of pessaries manufactured as standard products.

Fig. 7 is an end view looking at the gauging portions of Fig. 6 in open and closed position.

Fig. 8 is a sectional view taken, substantially, on the lines 8—8 of Fig. 6.

Fig. 9 is a view taken, substantially, on the lines 9—9 of Fig. 6.

Referring to the various Figures 1, 2, and 3, it is best to describe first such parts of the anatomical structure of the vagina, as will aid in understanding, and appreciating the teachings and practices of my invention.

In the various views, wherein the vaginal sectional structure is generally illustrated, the vaginal area is designated 26, the lowermost portion thereof, called the posterior fornix, is designated 24, directly above and to the right thereof is the projection at the terminal portion of the uterus 48 known as the cervix 25, thereabove and obliquely to the right and below the pubic bone wherein the pessary generally designated 12 is finally, or ultimately to be seated.

The diametral portion 14 thereof, which is an enlarged, resilient structure, may also have encased therein a metallic spring element for added strength, the said flanged resilient portion 14 is fitted, the object being to fit the same within the posterior fornix as one locating section, and the aforesaid area directly under the pubic bone designated 49. Hence, it is to be noted that the object is to measure the diameter between the posterior fornix 24 and the recessed portion 49. The said anatomical structure is usually of a fixed dimension, the areas referred to being non-elastic and thus the determination of the diametral distance or span between the areas 24 and 49 being fixed, the determination thereof will aid in prescribing the proper diameter of pessary needed.

To better understand the vaginal structure, the adjacent areas are also illustrated so as to show the proper relationship of parts, wherein the symphysis, is indicated at 27, the labium major is shown at 28, and the labium minor is shown at 29.

The vaginal area is designated 26, where the instrumentality comprising my invention is inserted. The placing of the pessary 12 in the proper position, as shown in Fig. 3 provides a seal at the mouth of the uterus 48, and is the main object and function of the contraceptive so used.

In order to gauge the opening, I provide an instrumentality generally designated 11 which, referring to Figs. 6 to 9, is illustrated in detail. In those figures, it will be seen that the invention consists of two handles 13 provided with special gripping portions, or protuberances 10 and concavities 15 as indicated in section of Fig. 8, in order to provide a suitable grip for the fingers of the hand when the same is being manipulated during insertion in, and removal from the vaginal cavity.

The said handles are urged apart, normally, by the spring structure 16, which is anchored at points 17 and 18 in between the handle structure, urging them in the position shown in the full lines. The handle portions 13 are provided with inwardly formed angular extensions which may be more aptly termed crossed levers or arms 19 and 20, having the flat portions 46 and 47, so that the same will be engaged in relative sliding engagement as will be hereinafter more clearly elucidated.

The legs 19 and 20 are fulcrumed on the pin 21 which is secured to the pinion 22 in engagement with the ledge 23 provided with rack teeth, the flat portion 46 also being provided with an elongated slotted opening 46", in order to permit a relative movement of the shorter leg 32, relative to the arcuate movement of the longer leg 33 when opening and closing the instrument. The arms 19 and 20 are adjacent the angularly bent portions 30, in turn connected to inwardly formed, substantially right angular portions 31, terminating in the legs 32 and 33, each leg having an angularly bent bifurcated portion 34 and 35, connected to the semi-circular gauging portions 36 and 37, which are preferably made of a plastic material of smooth surface so as to prevent damage or injury to the vaginal walls, where the said gauging portions may be caused to function, or operate. The pivot pin 21 is preferably welded at 45.

The closing of the handles 13, although effectuating a closure of the legs 32 and 33, yet by virtue of the pinion 22 and rack 23 a forward movement of leg 32 results maintaining the terminal circular gauging formation, or the elements 36 and 37 in the same plane, regardless of the magnitude or span between points 38 and 39.

The extreme outer, circumferential portions, diametrally opposed 38 and 39 perform the gauging operation when seated in the recess 49, and the recess of the posterior fornix 24. The portion 30 of one lever of the instrument has attached thereto, a gauging arcuately shaped dial 40 which has the graduations 41, from 50 to 90 millimeters. The other portion 30, of the other lever has secured thereto the arcuate extension 42, which has an overlapping or bent portion 43, terminating in the indicating portion or pointer 44; the same being arranged to allow sufficient play when the arm 19 is stationary, relative to the movable arm 20.

In normal position the instrument is shown in Fig. 6 in full lines. In compressing the same to the dotted lines, by squeezing handles 13 gripped in the hand, the instrument is brought to the dotted position, wherein the gauging elements 36 and 37 are brought together, in a complete circular assembly measuring approximately 50 millimeters.

The instrument, as can be seen in Fig. 4 has a circular formation when the elements 36 and 37 are closed. The said circular formation is at an angular relationship to the legs 32 and 33 facilitating entry of the gauging portion into the vaginal cavity 26. When brought to the position shown in Fig. 5, the handles 13, of the instrument are released by the hand, and allowed to find proper seating within the posterior fornix, and the area 49, respectively, by virtue of the diametral end portions 38 and 39. The gauging is then read on the graduations of the dial 40, and the size of the pessary thus determined, after which, the proper pessary 12 is selected and inserted into the vaginal cavity as indicated in Fig. 3.

I wish to stress, particularly, that I have provided an instrumentality which can be readily inserted into the vaginal cavity, and which will perform a gauging operation, thus simplifying the procedure of trial and error resorted to at the present time in taking pessaries of different diameters and inserting to see if they fit properly. The continual insertion and trial method consuming a great deal more time, whereas with my instrument, the procedure can be simplified, eliminating unpleasantness to the patient subjected to such gauging measurements.

I wish to point out, particularly, the fact that I have provided an instrument which has its gauging portion at relatively small angular relationship to the legs of the instrument to facilitate its insertion and removal, and an instrument which, when inserted, will find its own gauging level, thus indicating readily the gauging of the area required, providing a measurement for selection of the proper pessary for actual use.

I also wish to stress that my instrument is closed when inserted into the vaginal cavity, and is normally in open position, thus, after insertion, the handles may be released and the instrument gauging portions will almost position themselves in proper measuring relationship, automatically and without a great deal of uncertain manipulation on the part of the physician performing the measuring function.

Although I have herein described and revealed the nature of the construction of my invention, yet, inasmuch as the same is susceptible of modifications and improvements, I reserve the right to such modifications and improvements that come within the scope and spirit of my invention, and any that may fall within the purview of the foregoing description, or those that may be embraced in the accompanying drawings; my invention to be limited only by the appended claims.

Having thus described and revealed my in- vention, what I claim as novel and desire to secure by Letters Patent, is:

1. A vaginal gauge of the character described comprising, a pair of crossed lever members articulately secured intermediate their ends, each of said lever members provided with a terminal handle portion and an arcuate gauging portion secured to its other terminus, spring means confined between the handle portions of the said lever members normally urging the said handle portions and the gauging portions in spaced relationship, and equalizer fulcrum means comprising, a pivot secured to one of the said lever members, the other of said lever members being provided with a slotted portion slidably and articulately mounted on the said pivot, a pinion secured to the said pivot, and rack means on the said lever member in meshing engagement with the said pinion.

2. A vaginal gauge of the character described comprising, a pair of crossed lever members each provided with handle portions of equal length and leg portions of unequal length, spring means normally maintaining the said handle and leg portions in spaced relationship, gauge indicator means secured to the said crossed lever members at a point intermediate their ends, semi-circular gauging elements secured to the termini of the said leg portions, and equalizer fulcrum means constructed and arranged to maintain the said semi-circular gauging elements in the same geometric plane at any position within the gamut of open and closed positions thereof, the said equalizer fulcrum means comprising, a pivot secured to one of the said lever members, the other of said lever members being provided with a slotted portion slidably and articulately mounted on the said pivot, a pinion secured to the said pivot, and rack means on the said other lever member in meshing engagement with the said pinion.

3. A vaginal gauge of the character described comprising, a pair of crossed lever members each provided with handle portions of equal length and leg portions of unequal length, spring means normally maintaining the said handle and leg portions in spaced relationship, gauge indicator means secured to the said crossed lever members at a point intermediate their ends, semi-circular gauging elements secured to the termini of the said leg portions, and equalizer fulcrum means comprising, a pivot secured to one of the said lever members, the other of said lever members being provided with a slotted portion slidably and articulately mounted on the said pivot, a pinion secured to the said pivot, and rack means on the said other lever member in meshing engagement with the said pinion.

4. A vaginal gauge of the character described comprising, a pair of crossed lever members each provided with handle portions of equal length and leg portions of unequal length, spring means normally maintaining the said handle and leg portions in spaced relationship, gauge indicator means secured to the said crossed lever members at a point intermediate their ends, semi-circular gauging elements secured to the termini of the said leg portions, and equalizer fulcrum means constructed and arranged to maintain the said semi-circular gauging elements in the same geometric plane at any position within the gamut of open and closed positions thereof, the said equalizer fulcrum means comprising, a pivot secured to one of the said lever members, the other of said lever members being provided with a slotted portion slidably and articulately mounted on the said pivot, a pinion secured to the said pivot, and rack means on the said other lever member in meshing engagement with the said pinion.

ERWIN B. WOLFFE.

REFERENCES CITED

The following references are of record in the file of this patent:

UNITED STATES PATENTS

| Number | Name | Date |
| --- | --- | --- |
| 466,986 | Van Roden | Jan. 12, 1892 |
| 1,238,440 | Running | Aug. 28, 1917 |
| 1,528,273 | Shwed | Mar. 3, 1925 |
| 1,692,014 | Winn | Nov. 20, 1928 |
| 1,734,958 | Audrieth | Nov. 12, 1929 |
| 1,953,498 | Rieri | Apr. 3, 1934 |

FOREIGN PATENTS

| Number | Country | Date |
| --- | --- | --- |
| 546,843 | Great Britain | July 31, 1942 |